Patented May 4, 1943

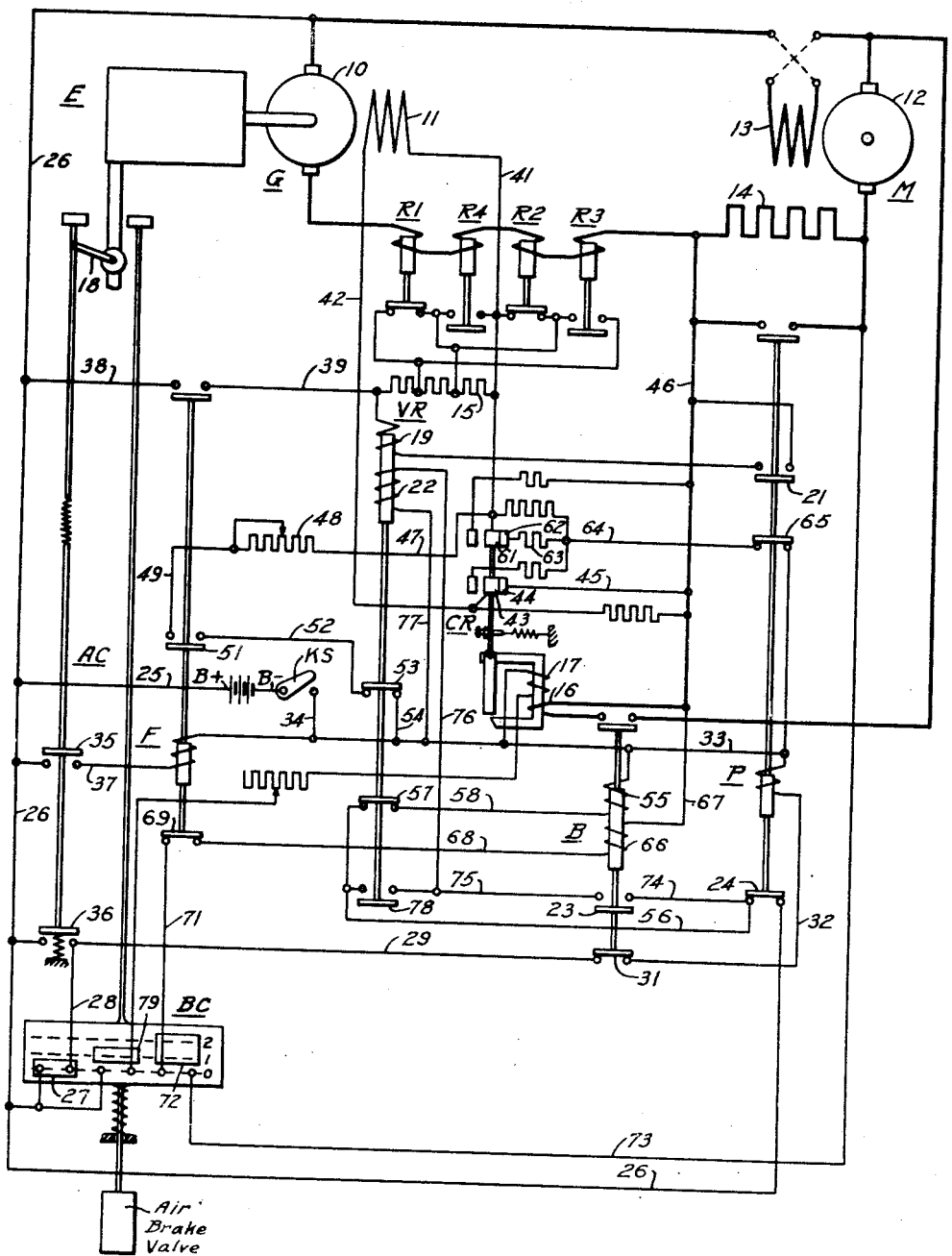

2,318,043

UNITED STATES PATENT OFFICE 2,318,043

CONTROL SYSTEM

Bascum O. Austin, Forest Hills, Pa., assignor to Westinghouse Electric & Manufacturing Company, East Pittsburgh, Pa., a corporation of Pennsylvania Application July 12, 1941, Serial No. 402,169

13 Claims. (Cl. 290—17)

My invention relates, generally, to control systems and, more particularly, to systems for controlling the operation of Diesel or gas-electric buses.

Buses of the Diesel or gas-electric type are operated by two pedals known as the accelereator pedal and the brake pedal. These pedals function in much the same manner as the control pedals on a standard automobile. Likewise, they re located in the same relative positions as in in automobile. However, there is no clutch pedal, since a mechanical clutch is not utilized in Diesel or ges-electric vehicles.

An object of my invention is to control the acceleration and the electric braking of a Diesel or gas-electric vehicle.

Another object of my invention is to automatically regulate the electric braking of a Diesel or gas-electric vehicle.

A further object of my invention is to automatically control the field excitation of the generator in a Diesel or gas-electric vehicle.

Still another object of my invention is to prevent current from circulating through the electrical equipment on a vehicle while it is standing with the air brakes applied.

A still further object of my invention is to prevent a Diesel or gas-electric vehicle from running backward on a grade by means of dynamic braking of the motor.

Other objects of my invention will be explained fully hereinafter or will be apparent to those skilled in the art.

In accordance with my invention, the field winding of the motor of a Diesel or gas-electric vehicle is excited by the generator during electric braking. The braking current is regulated by a current responsive relay which controls the excitation of the generator. During acceleration the generator excitation is regulated by a voltage responsive relay which is also utilized to control the deenergization of the electrical equipment when the vehicle is brought to a standstill.

For a fuller understanding of the nature and objects of my invention, reference may be had to the following detailed description, taken in conjunction with the accompanying drawing in which the single figure is a diagrammatic view of a control system embodying my invention.

Referring to the drawing, the system shown therein comprises an engine E for driving a generator G which supplies current to a motor M of a type suitable for propelling a vehicle (not shown). The generator G has an armature winding 10 and a field winding 11. The motor M has an armature winding 12 and a series field winding 13. An electrically operated switch P is provided for connecting the armature 10 of the generator G, the armature 12 of the motor M and its series field winding 13 in series-circuit relation when it is desired to propel the vehicle. A switch B is provided for establishing dynamic braking connections for the motor M when it is desired to retard the vehicle by electrical braking. A resistor 14 is connected in the braking circuit for the armature 12 of the motor M during dynamic braking. The field winding 13 of the motor M is energized by the generator G during dynamic braking.

The engine speed is regulated by controlling the generator excitation by means of a plurality of relays R1, R2, R3 and R4, responsive to the generator current, as fully described and claimed in the copending application of B. O. Austin and C. A. Atwell, Serial No. 315,374, filed January 24, 1940. The relays R1, R2, R3 and R4 are set to operate in a predetermined sequence to vary the generator excitation by shunting portions of a resistor 15 from the circuit for the field winding 11, thereby controlling the load on the engine to regulate the engine speed.

A switch F is provided for connecting the field winding 11 across the armature 10 of the generator G during acceleration of the vehicle. During dynamic braking of the vehicle the excitation for the generator G is provided from a separate source, which may be a storage battery or other suitable source of direct current power.

A current regulating relay CR, which is of the vibrating type, is provided for regulating the excitation of the generator field winding 11 during dynamic braking. The relay CR is not utilized during acceleration, at which time the excitation of the generator is controlled by the relays R1, R2, R3 and R4, as hereinbefore described. The relay CR is provided with a current winding 16 which is connected in the dynamic braking circuit for the motor M. The relay CR is also provided with a winding 17 which may be connected across the storage battery to change the setting of the relay CR, thereby varying the braking rate.

A braking controller BC, which may be of the drum type and pedal operated if desired, is provided for controlling the energization of the winding 17 of the relay CR and also the operation of the braking switch B. An acceleration switch or controller AC, which may also be pedal operated and mechanically connected with an accelerator or throttle valve 18 for the engine E, cooperates with the braking controller BC in the control of the switches P and B. The acceleration controller AC also controls the operation of the switch F for energizing the field winding of the generator G during acceleration of the vehicle. The controller BC may be so connected with the airbrake system for the vehicle that the airbrakes operate in conjunction with the electrical braking in stopping the vehicle.

In order to make the generator voltage build up more rapidly during the early portion of the accelerating period, the field winding 11 is excited from the storage battery as well as being self excited from the generator. A voltage responsive relay VR is provided for automatically cutting off the battery excitation when the generator attains a predetermined voltage and the battery excitation is no longer required. The relay VR is provided with a coil 19 which is connected across the generator armature through the switch F and an interlock 21 on the switch P during the accelerating period. In this manner the relay VR is responsive to the generator voltage and may be utilized to control the generator excitation.

The relay VR is also provided with a coil 22 which is connected across the storage battery through interlocks 23 and 24 on the switches B and P, respectively. In this manner the relay VR may be utilized to control the operation of the switch B to prevent the generator from circulating current through the motor field and the generator armature while the bus is standing, as will be more fully described hereinafter.

A key switch KS, which corresponds to the usual ignition switch on an automobile, is provided for disconnecting the storage battery from the control circuits when the vehicle is standing and the engine is not running. When the vehicle is standing with the engine idling with both the accelerator pedal and the brake pedal released and the key switch KS closed, the switch P is held closed, thereby connecting the generator G and motor M in a closed circuit for driving the vehicle. In the released position of the control pedals the actuating coil for the switch P is energized through a circuit which may be traced from B+ through conductors 25 and 26, contact segment 27 on the controller BC, conductors 28 and 29, an interlock 31 on the switch B, conductor 32, the actuating coil of switch P, conductors 33 and 34, and the switch KS to B—. In this manner, the switch P is normally held closed with both the accelerator pedal and the brake pedal released.

In order to accelerate the vehicle, the accelerator pedal AC is depressed, thereby opening the throttle valve 18 and closing the contact members 35 and 36 on the accelerator controller. The closing of the contact member 35 establishes an energizing circuit for the actuating coil of the switch F which extends from conductor 26 through the contact member 35, conductor 37, the actuating coil of the switch F, the conductors 33 and 34, and the switch KS to B—. The closing of the switch F connects the generator field winding 11 across the armature of the generator through a circuit which may be traced from one terminal of the generator G through conductors 26 and 38, the switch F, conductor 39, the resistor 15, conductor 41, the field winding 11, conductor 42, contact members 43 and 44 of the relay CR, conductors 45 and 46 and the coils of the relays R3, R2, R4 and R1 to the other terminal of the generator G.

The opening of the throttle 18 causes the engine E to increase its speed. The generator voltage increases and current flows from the generator armature through the engine speed relay coils R1, R2, R3 and R4 through the switch P, the motor armature 12, and the series field winding 13 back to the generator G. In this manner voltage is gradually applied to the motor and the vehicle brought up to speed.

As explained hereinbefore the generator is also excited from the battery to make the generator voltage build up more rapidly during the early portion of the accelerating period. The battery excitation circuit for the generator field winding 11 may be traced from B+ through conductors 25 and 26, the generator armature 10, the relay coils R1, R4, R2 and R3, conductors 46 and 45, the contact members 44 and 43 of the relay CR, conductor 42, the field winding 11, conductors 41 and 47, a resistor 48, conductor 49, an interlock 51 on the switch F, conductor 52, contact members 53 on the relay VR, conductors 54, 33 and 34 and the switch KS to B—. As explained hereinbefore, the coil 19 of the relay VR is connected across the generator armature. Therefore, when the generator voltage is increased to a predetermined value the relay VR operates to open the contact members 53, thereby cutting off the battery excitation which is no longer required.

When the vehicle attains the desired speed, the accelerator pedal is returned to the released position and the vehicle coasts until a braking effect is desired. As illustrated, the electric brake is controlled by the airbrake pedal. However, if desired, it could be arranged to be applied by returning the power pedal to the off position.

While the vehicle is coasting, the switch P is held closed, since its actuating coil is energized through the contact segment 27 of the braking controller BC. However, during coasting the switch F is open, since its actuating coil is deenergized by the opening of the contact members 35 of the accelerator control AC. Therefore, the field winding 11 of the generator is not excited from the armature of the generator. Also, the interlock 51 on the switch F opens the battery excitation circuit for the field winding of the generator. Therefore, there is only residual excitation left in the generator and the engine is operating at idling speed since the throttle valve 18 is returned to the idling position by releasing the accelerator control AC.

The electric brake is applied by the first initial movement of the braking pedal, thereby opening the circuit through the contact segment 27 on the controller BC which deenergizes the actuating coil for the switch P causing this switch to open. The braking switch B is then closed as the result of the energization of its closing coil 55 through a circuit which may be traced from B+ through conductors 25 and 26, interlock 24 on the switch P, conductor 56, contact members 57 on the relay VR, conductor 58, the closing coil 55 of the switch B, conductors 33 and 34 and the switch KS to B—.

As explained hereinbefore, when the switch B is closed and the switch P is open the generator G excites the field winding 13 of the motor M and thereby causes the motor to function as a generator and circulate current through the resistor 14 and the current coil of the regulating relay CR. The energy of the vehicle is dissipated in the resistor 14 during braking and the braking current is regulated by the relay CR.

The field of the generator is battery excited during braking, no self excitation being utilized. The battery excitation circuit may be traced from B+ through conductors 25 and 26, the generator armature, the relays R1, R4, R2 and R3, conductors 46 and 45, the contact members 44 and 43 of the relay CR, conductor 42, the field winding 11, conductor 41, contact members 61 and 62 of the relay CR, a resistor 63, conductor 64, an interlock 65 on the switch P, conductors 33 and 34 and switch KS to B—.

The relay CR regulates the generator excitation to maintain a predetermined current in the braking circuit. Therefore, the battery excitation is increased as the bus speed is reduced. When the vehicle speed is sufficiently low full battery excitation is applied and the motor braking current begins to fade with a further decrease in the vehicle speed. The airbrake may then be applied to bring the vehicle to a complete stop. If desired, the airbrake may be applied simultaneously with the electric brake by manipulation of the brake pedal.

If the electric brake is applied while the engine is operating at a high idling speed there may be too much motor field excitation as a result of the high generator speed. In order to prevent an excessive motor voltage, the relay CR is provided with a set of back contacts which are momentarily closed to reverse the battery excitation of the generator field in order to lower the excitation of the motor field until the engine speed is reduced to its normal idling speed. The foregoing condition may occur when rapid application of the electric brake is made just after removing the foot from the accelerating pedal and the engine speed has not had sufficient time to reduce to the normal idling speed.

In order to prevent the generator from circulating current through the motor field and the generator armature while the vehicle is standing, the braking switch B is opened before the vehicle comes to a complete stop. This is accomplished by providing a holding coil 66 on the switch B which is connected across the braking resistor 14 and is therefore energized by the voltage drop across this resistor. Thus the holding coil 66 will not hold the switch B closed when the generated volts of the motor approach zero or the vehicle speed is approaching zero. The energizing circuit for the coil 66 may be traced from one terminal of the resistor 14 through conductors 46 and 67, the coil 66, conductor 68, an interlock 69 on the switch F, conductor 71, contact segment 72 on the controller BC, and conductor 73 to the other terminal of the resistor 14.

As explained hereinbefore, the closing coil 55 of the switch B is energized through contact members 57 of the relay VR. When the switch B closes the coil 22 of the relay VR is energized from the battery through a circuit which extends from B+ through conductors 25 and 26, the interlock 24 on the switch P, conductor 74, the interlock 23 on the switch B, conductors 75 and 76, the coil 22, conductors 77, 33 and 34, and the switch KS to B—. Accordingly, the relay VR opens its contact members 57 to deenergize the closing coil 55 of the switch B. However, the switch is held closed by the holding coil 66 until the vehicle speed is reduced so low that there is insufficient braking current to produce any braking effect.

If the brake is applied while the vehicle is standing, the switch B will close momentarily, since the contact member 57 on the relay VR will be closed to establish an energizing circuit for the coil of switch B. However, the coil 22 of the relay VR is energized through the interlock 23 on the switch B, thereby operating the relay VR to deenergize the closing coil of the switch B. A contact member 78 on the relay VR shunts the interlock 23 on the switch B, thereby preventing the relay VR from being deenergized until the brake is released. As explained hereinbefore, the holding coil of the switch B will not hold the switch closed, since the motor is at zero speed and no voltage is applied to the holding coil. Therefore, no current is permitted to circulate through the generator and the motor field while the vehicle is standing and the brake is applied.

The dynamic brake may be released at any vehicle speed by releasing the brake pedal, thereby opening the circuit through the contact segments 72 of the braking controller and deenergizing the holding coil 66 on the braking switch B. The switch P is closed by the energization of its actuating coil through the contact segment 27 when the brake controller is in the released position.

The switch P is kept closed at all times except when the brake is being utilized. In this manner the vehicle is prevented from running backward on grades so long as the generator and motor circuits are in a motoring position. Any backward motion of the vehicle will cause the motor to brake dynamically through the generator, whether or not the generator is running.

The contact members 36 on the accelerator controller AC which shunt the contact segment 27 on the braking controller BC are for the purpose of preventing the switch P from opening when the accelerator pedal is depressed and the brake pedal depressed immediately afterwards. This permits power and brake to be applied at the same time which combination may be utilized on icy streets to prevent skidding of the vehicle.

If the brake pedal is pressed first, power will predominate if the accelerator pedal is pressed afterwards to close the switch F. The interlock 69 on the switch F releases the switch B and the interlock 31 on the switch B then causes the switch P to close. The vehicle will then be driven by the motor M while the airbrake is applied. In other words the power predominates under all conditions of operation so long as the accelerator pedal is depressed at any time.

As explained hereinbefore, the setting of the relay CR may be changed by energizing the coil 17 to vary the braking rate. The coil 17 is connected across the battery through a contact segment 79 on the braking controller BC. Thus, if a relatively low braking rate is desired the controller BC may be actuated to position 1, in which position the coil 17 is energized and causes the relay CR to maintain a lower braking current. If maximum braking rate is desired, the controller BC may be actuated to position 2 in which position the coil 17 is not energized and more current is required in the series coil 16 on the relay CR to operate the relay. Accordingly, the relay regulates for a higher braking current, resulting in a higher braking rate.

As explained hereinbefore the relays R1, R2, R3 and R4 regulate the engine speed during motoring operation of the vehicle. During braking of the vehicle the engine operates at its idling speed.

From the foregoing description, it is apparent that I have provided a system for controlling both the acceleration and the electric braking of a self propelled vehicle such as a Diesel or gas-electric bus. Furthermore, the rate of electric braking of the vehicle may be varied as desired by the operator.

Since many modifications may be made in the apparatus and arrangement of parts without departing from the spirit of my invention, I do not wish to be limited other than by the scope of the appended claims.

I claim as my invention:

1. In a control system, in combination, a motor having an armature winding and a field winding, a generator for supplying current to the motor, an engine for driving the generator, switching means for connecting the generator and the motor armature and field winding in series-circuit relation for motoring operation, additional switching means for establishing dynamic braking connections for the motor, means for connecting said motor field winding for energization by the generator during dynamic braking, an engine accelerator controller, and a braking controller, said controllers cooperating in controlling the operation of said switching means.

2. In a control system, in combination, a motor having an armature winding and a field winding, a generator for supplying current to the motor, an engine for driving the generator, switching means for connecting the generator and the motor armature and field winding in series-circuit relation for motoring operation, additional switching means for establishing dynamic braking connections for the motor, means for connecting said motor field winding for energization by the generator during dynamic braking, and independently operable controllers for controlling the engine speed and electric braking, said controllers cooperating in controlling the operation of said switching means.

3. In a control system, in combination, a motor for driving a vehicle, said motor having an armature winding and a field winding, a generator for supplying current to the motor, an engine for driving the generator, switching means for connecting the generator and the motor armature and field winding in series-circuit relation to propel the vehicle, additional switching means for establishing dynamic braking connections for the motor, means for connecting said motor field winding for energization by the generator during dynamic braking, an engine accelerator controller, and a controller for controlling the vehicle braking, said controllers cooperating in controlling the operation of said switching means.

4. In a control system, in combination, a motor for driving a vehicle, said motor having an armature winding and a field winding, a generator for supplying current to the motor, an engine for driving the generator, switching means for connecting the generator and the motor armature and field winding in series-circuit relation to propel the vehicle, additional switching means for establishing a dynamic braking circuit for the motor, means for connecting said motor field winding for energization by the generator during dynamic braking, relay means responsive to the braking current for controlling the generator excitation during dynamic braking, a controller for controlling the operation of said switching means, and means associated with said controller for changing the calibration of said relay means.

5. In a control system, in combination, a motor for driving a vehicle, said motor having an armature winding and a field winding, a generator for supplying current to the motor, an engine for driving the generator, switching means for connecting the generator and the motor armature and field winding in series-circuit relation to propel the vehicle, additional switching means for establishing a dynamic braking circuit for the motor, means for connecting said motor field winding for energization by the generator during dynamic braking, a relay for controlling the generator excitation during dynamic braking, said relay having an actuating coil connected in the dynamic braking circuit and a calibrating coil, and separate means for energizing said calibrating coil.

6. In a control system, in combination, a motor for driving a vehicle, said motor having an armature winding and a field winding, a generator for supplying current to the motor, an engine for driving the generator, switching means for connecting the generator and the motor armature and field winding in series-circuit relation to propel the vehicle, additional switching means for establishing a dynamic braking circuit for the motor, means for connecting said motor field winding for energization by the generator during dynamic braking, a relay for controlling the generator excitation during dynamic braking, said relay having an actuating coil connected in the dynamic braking circuit and a calibrating coil, separate means for energizing said calibrating coil, and a braking controller for controlling the energization of the calibrating coil.

7. In a control system, in combination, a motor for driving a vehicle, said motor having an armature winding and a field winding, a generator for supplying current to the motor, an engine for driving the generator, switching means for connecting the generator and the motor armature and field winding in series-circuit relation to propel the vehicle, additional switching means for establishing a dynamic braking circuit for the motor, means for connecting said motor field winding for energization by the generator during dynamic braking, a relay for controlling the generator excitation during dynamic braking, said relay having an actuating coil connected in the dynamic braking circuit and a calibrating coil, separate means for energizing said calibrating coil, and a braking controller for controlling the energization of the calibrating coil, said braking controller also controlling the operation of the switching means for establishing the dynamic braking circuit for the motor.

8. In a control system, in combination, a motor for driving a vehicle, said motor having an armature winding and a field winding, a generator for supplying current to the motor, an engine for driving the generator, switching means for connecting the generator and the motor armature and field winding in series-circuit relation to propel the vehicle, additional switching means for establishing a dynamic braking circuit for the motor, means for connecting said motor field winding for energization by the generator during dynamic braking, a relay for controlling the generator excitation during dynamic braking, said relay having an actuating coil connected in the dynamic braking circuit and a calibrating coil, separate means for energizing said calibrating coil, a braking controller for controlling the energization of the calibrating coil, said braking controller also controlling the operation of the switching means for establishing the dynamic braking circuit for the motor, and an accelerating controller cooperating with the braking controller in controlling the operation of said switching means.

9. In a control system, in combination, a motor for driving a vehicle, a generator for supplying current to the motor, said generator having an armature winding and a field winding, an engine for driving the generator, switching means for connecting the generator armature and the motor in series-circuit relation to propel the vehicle, additional switching means for establishing dynamic braking connections for the motor, a switch for connecting the generator field winding across the generator armature, an additional source of excitation for the generator field winding, and a relay responsive to the generator voltage for connecting the generator field winding to said additional source of excitation, said relay having an actuating coil connected across the generator armature through said switch.

10. In a control system, in combination, a motor for driving a vehicle, a generator for supplying current to the motor, said generator having an armature winding and a field winding, an engine for driving the generator, switching means for connecting the generator armature and the motor in series-circuit relation to propel the vehicle, additional switching means for establishing dynamic braking connections for the motor, a switch for connecting the generator field winding across the generator armature, an additional source of excitation for the generator field winding, a relay responsive to the generator voltage for connecting the generator field winding to said additional source of excitation, said relay having an actuating coil connected across the generator armature through said switch, and an additional coil on said relay energized through said switching means.

11. In a control system, in combination, a motor for driving a vehicle, a generator for supplying current to the motor, said generator having an armature winding and a field winding, an engine for driving the generator, switching means for connecting the generator armature and the motor in series-circuit relation to propel the vehicle, additional switching means for establishing dynamic braking connections for the motor, a switch for connecting the generator field winding across the generator armature, an additional source of excitation for the generator field winding, a relay responsive to the generator voltage for connecting the generator field winding to said additional source of excitation, said relay having an actuating coil connected across the generator armature through said switch, an additional coil on said relay energized through said switching means, and an accelerator controller and a braking controller cooperating in the control of said switching means.

12. In a control system, in combination, a motor for driving a vehicle, a generator for supplying current to the motor, said generator having an armature winding and a field winding, an engine for driving the generator, switching means for connecting the generator armature and the motor in series-circuit relation to propel the vehicle, additional switching means for establishing dynamic braking connections for the motor, a switch for connecting the generator field winding across the generator armature, an additional source of excitation for the generator field winding, a relay responsive to the generator voltage for connecting the generator field winding to said additional source of excitation, said relay having an actuating coil connected across the generator armature through said switch, and an additional coil on said relay energized through said switching means, an accelerator controller for controlling the operation of said switch, and a braking controller cooperating with said accelerator controller in the control of said switching means.

13. In a control system, in combination, a motor for driving a vehicle, a generator for supplying current to the motor, said generator having an armature winding and a field winding, an engine for driving the generator, switching means for connecting the generator armature and the motor in series-circuit relation to propel the vehicle, additional switching means for establishing dynamic braking connections for the motor, a switch for connecting the generator field winding across the generator armature, an additional source of excitation for the generator field winding, a relay responsive to the generator voltage for connecting the generator field winding to said additional source of excitation, said relay having an actuating coil connected across the generator armature through said switch, and an additional coil on said relay energized through said switching means, an accelerator controller for controlling the operation of said switch, and a braking controller cooperating with said accelerator controller in the control of said switching means, said switching means for connecting the generator armature and the motor in series-circuit relation being closed at all times except when the braking controller is operated to apply the vehicle brakes.

BASCUM O. AUSTIN.